(12) United States Patent
Ding

(10) Patent No.: US 8,657,179 B1
(45) Date of Patent: Feb. 25, 2014

(54) WELD NUGGET TEMPERATURE CONTROL IN THERMAL STIR WELDING

(75) Inventor: R. Jeffrey Ding, Athens, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 13/430,268

(22) Filed: Mar. 26, 2012

(51) Int. Cl.
*B23K 20/12* (2006.01)
*B23K 37/00* (2006.01)

(52) U.S. Cl.
USPC .......................................... 228/2.1; 228/112.1

(58) Field of Classification Search
USPC .............................................. 228/2.1, 112.1
See application file for complete search history.

(56) References Cited

U.S. PATENT DOCUMENTS

| | | | |
|---|---|---|---|
| 3,145,285 A | 8/1964 | Kohler | |
| 4,195,523 A * | 4/1980 | Tasman et al. | 374/208 |
| 4,359,210 A | 11/1982 | Peterson | |
| 4,529,115 A | 7/1985 | Renshaw et al. | |
| 4,705,937 A | 11/1987 | Marek | |
| 5,760,379 A | 6/1998 | Matsen et al. | |
| 6,333,484 B1 | 12/2001 | Foster et al. | |
| 6,613,169 B2 | 9/2003 | Georgeson et al. | |
| 7,032,801 B2* | 4/2006 | Raether et al. | 228/2.1 |
| 7,121,448 B2* | 10/2006 | Subramanian et al. | 228/2.1 |
| 7,156,277 B2* | 1/2007 | Ishikawa et al. | 228/2.1 |
| 7,247,810 B2* | 7/2007 | Goetz et al. | 219/110 |
| 7,470,056 B2 | 12/2008 | Yuhas | |
| 7,568,608 B1* | 8/2009 | Ding | 228/110.1 |
| 7,980,449 B2 | 7/2011 | Ding | |
| 8,183,493 B2* | 5/2012 | Batzinger et al. | 219/109 |
| 8,393,520 B1* | 3/2013 | Ding | 228/112.1 |
| 2004/0000576 A1* | 1/2004 | Litwinski | 228/112.1 |
| 2005/0006438 A1* | 1/2005 | Andersson et al. | 228/112.1 |
| 2006/0196607 A1 | 9/2006 | Halfmann et al. | |
| 2007/0158321 A1 | 7/2007 | Caddell, Jr. et al. | |
| 2008/0105659 A1 | 5/2008 | Arnett et al. | |
| 2009/0014497 A1 | 1/2009 | Ryu | |
| 2009/0255980 A1* | 10/2009 | Li et al. | 228/102 |
| 2010/0224598 A1 | 9/2010 | Liu | |
| 2010/0288734 A1 | 11/2010 | Dave et al. | |
| 2011/0172802 A1 | 7/2011 | Babb et al. | |
| 2011/0186204 A1 | 8/2011 | Cai et al. | |
| 2011/0284508 A1* | 11/2011 | Miura et al. | 219/121.64 |
| 2011/0284527 A1 | 11/2011 | Holverson et al. | |
| 2012/0261457 A1* | 10/2012 | Ohashi et al. | 228/102 |

FOREIGN PATENT DOCUMENTS

| KR | 2010023985 A | 3/2010 |
|---|---|---|
| WO | WO2007006669 A1 | 1/2007 |

* cited by examiner

*Primary Examiner* — Devang R Patel
(74) *Attorney, Agent, or Firm* — Peter J. Van Bergen; James J. McGroary

(57) ABSTRACT

A control system for a thermal stir welding system is provided. The control system includes a sensor and a controller. The sensor is coupled to the welding system's containment plate assembly and generates signals indicative of temperature of a region adjacent and parallel to the welding system's stir rod. The controller is coupled to the sensor and generates at least one control signal using the sensor signals indicative of temperature. The controller is also coupled to the welding system such that at least one of rotational speed of the stir rod, heat supplied by the welding system's induction heater, and feed speed of the welding system's weld material feeder are controlled based on the control signal(s).

6 Claims, 2 Drawing Sheets

WELD NUGGET TEMPERATURE CONTROL IN THERMAL STIR WELDING

ORIGIN OF THE INVENTION

Figure 1:
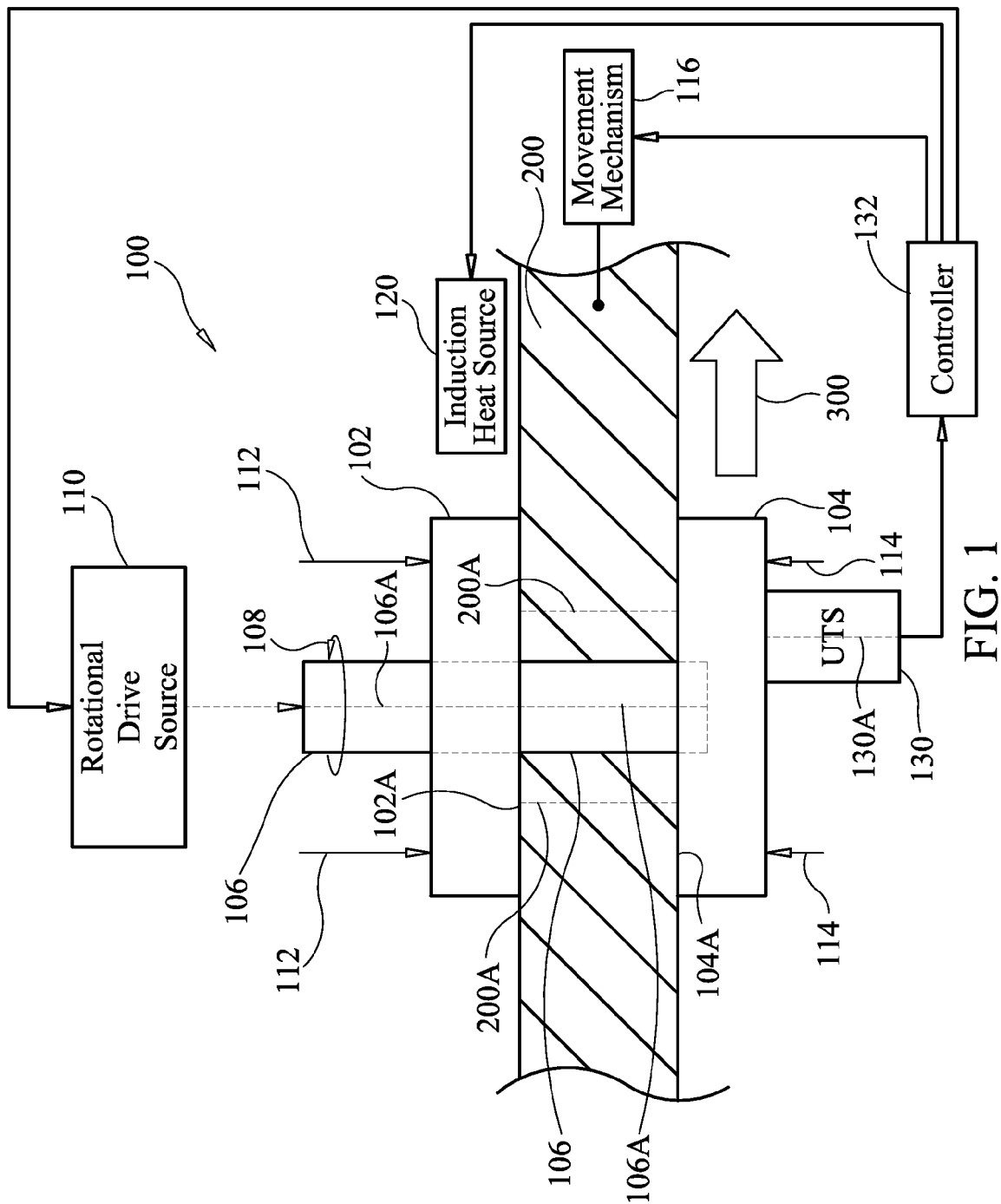

The invention was made by an employee of the United States Government and may be manufactured and used by or for the Government for governmental purposes without the payment of any royalties.

BACKGROUND OF THE INVENTION

1. Field of the Invention

This invention relates to stir welding systems. More specifically, the invention is a method and system for weld nugget temperature control for thermal stir welding systems and processes.

2. Description of the Related Art

Stir welding is a form of welding that utilizes a small stir pin to mix abutting or faying surfaces of two pieces of material (e.g., metal materials) to thereby form a joint between the two pieces of material. There are several types of stir welding systems/processes. For example, thermal stir welding (TSW) is a solid-state welding process in which weld work pieces to be joined are heated (e.g., by an induction heater) and drawn by heavy forces between two containment plates applying compressive forces to the work pieces. The TSW stir pin is located between the containment plates and is rotated to create a join between the weld work pieces as they are drawn through the containment plates.

During a TSW process, the temperature of the stir pin has been used to control the power supplied to the induction heater to thereby control the temperature of the weld work pieces. However, the temperature of the stir pin is not necessarily the same as the temperature of the weld pieces. This is important for some materials that can only be welded if a tight temperature window is maintained at the weld (or in the "weld nugget" as it is also known). Furthermore, temperature of the weld nugget can also be affected by the rotational speed of the stir pin and the feed speed of the weld work pieces. Thus, just controlling a TSW system's heater may not provide the level of precise temperature control needed to produce good weld results.

SUMMARY OF THE INVENTION

Accordingly, it is an object of the present invention to provide weld nugget temperature control for a thermal stir welding system/process.

Another object of the present invention is to provide a thermal stir welding system that includes temperature control of the weld nugget.

Other objects and advantages of the present invention will become more obvious hereinafter in the specification and drawings.

In accordance with the present invention, a control system for a thermal stir welding system is provided. The thermal stir welding system includes a containment plate assembly, a rotatable stir rod, an induction heater, and a weld material feeder. The control system includes a sensor and a controller. The sensor is coupled to the containment plate assembly and generates signals indicative of temperature of a region adjacent and parallel to the stir rod. The controller is coupled to the sensor and generates at least one control signal using the sensor signals indicative of temperature. The controller is also coupled to the thermal stir welding system such that at least one of rotational speed of the rotatable stir rod, heat supplied by the induction heater, and feed speed of the weld material feeder are controlled based on the control signal(s).

BRIEF DESCRIPTION OF THE DRAWING(S)

Figure 2:
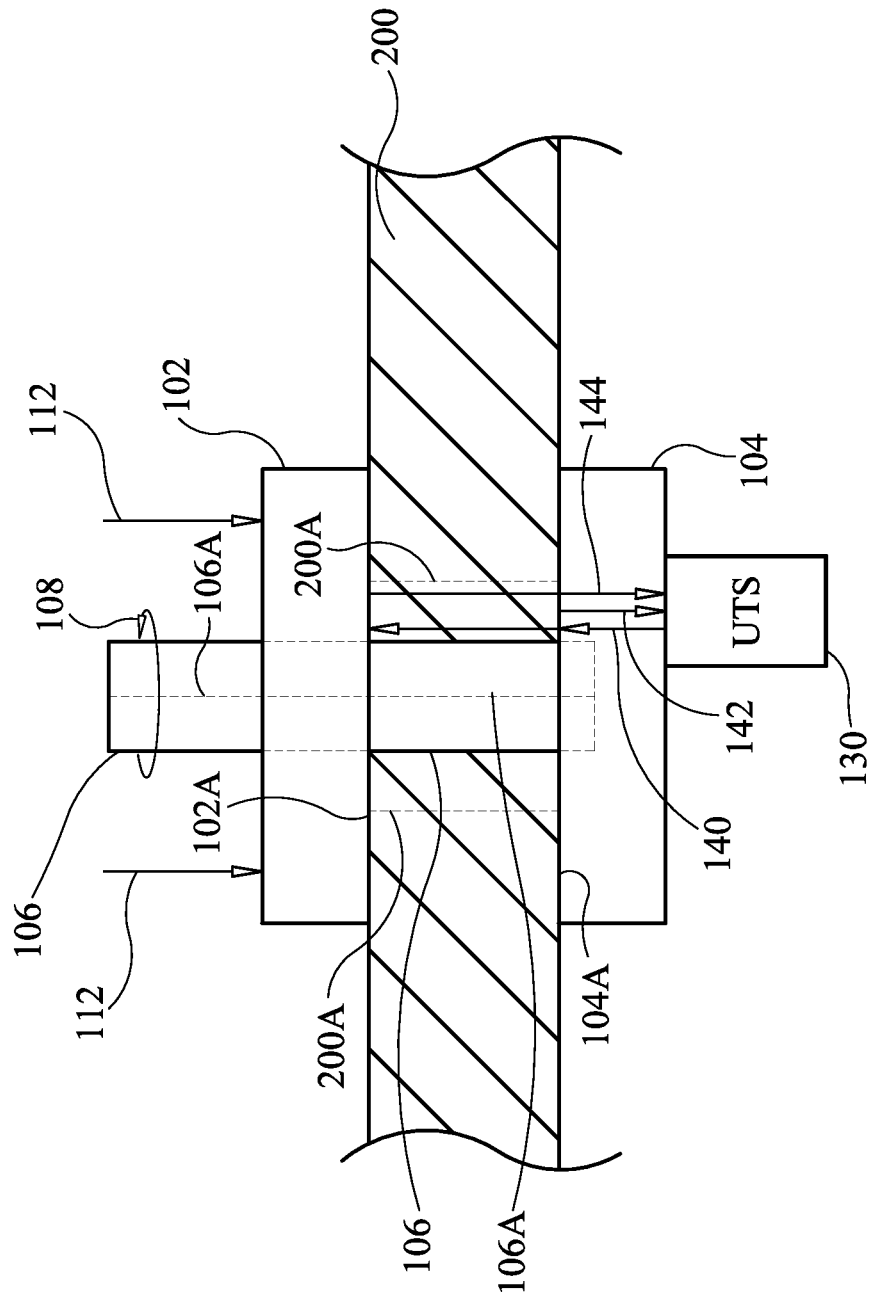

Other objects, features and advantages of the present invention will become apparent upon reference to the following description of the preferred embodiments and to the drawings, wherein corresponding reference characters indicate corresponding parts throughout the several views of the drawings and wherein:

FIG. 1 is a schematic view of a thermal stir welding system configured for temperature control of the weld nugget in accordance with an embodiment of the present invention; and FIG. 2 is an isolated view of the welding head assembly and weld work piece(s) constrained thereby diagrammatically illustrating the ultrasonic transmissions and resulting echoes used in the temperature control system and process in accordance with the present invention.

DESCRIPTION OF THE PREFERRED EMBODIMENT(S)

Referring now to the drawings and more particularly to FIG. 1, a thermal stir welding system equipped with weld nugget temperature control in accordance with the present invention is illustrated in FIG. 1 and is referenced generally by numeral 100. System 100 includes elements of a thermal stir welding system and weld nugget temperature control elements. With respect to the elements of a thermal stir welding system, system 100 includes a welding head assembly in contact with a work piece (or work pieces) 200 to be welded. More specifically, the welding head assembly includes a first non-rotating and rigid (e.g., metal) containment plate 102, a second non-rotating and rigid (e.g., metal) containment plate 104, and a stir pin or rod 106 passing through plate 102 and supported by plate 104 (e.g., partially inserted in or passing through plate 104). It is to be understood that the term "plate" as used herein for plate 102 and plate 104 is meant to include plate assemblies where multiple parts/layers can be used to create plate 102 and 104 without departing from the scope of the present invention. Regardless of their particular construction, plates 102 and 104 define opposing respective planar surfaces 102A and 104A that are typically maintained parallel to one another.

Rod 106 is supported by plates 102/104 such that it can be rotated about its longitudinal axis 106A as indicated by rotational arrow 108. Rod 106 is generally made from a rigid material (e.g., metal) to define a substantially cylindrical shape at least where rod 106 is in contact with work piece 200. A rotational drive source 110 is coupled to rod 106 to provide the energy for rotation 108. During a welding operation when rod 106 is rotating, compressive forces 112 and 114 are applied to plates 102 and 104, respectively, so that work piece 200 between plates 102 and 104 is compressed as rod 106 rotates.

During the welding operation, the above-described welding head assembly and work piece 200 will also experience relative movement as indicated by arrow 300. That is, work piece 200 is generally drawn by a pulling force aligned with relative movement arrow 300 as compressive forces 112 and 114 are applied to plates 102 and 104, respectively. The force that generates relative movement 300 can be provided by a movement mechanism 116 coupled to work piece 200 such that work piece 200 is moved while the welding head assembly remains stationary. However, it is to be understood that work piece 200 could be held stationary while the welding head assembly was moved by movement mechanism 116 to create relative movement 300 without departing from the scope of the present invention.

In accordance with the thermal stir welding principles, an induction heat source 120 is spaced apart from the welding hand assembly in order to supply heat in the vicinity of rod 106 as it rotates. Induction heat source 120 is appropriately positioned based on relative movement 300 for heating the material(s) to be welded into a plastic state in the vicinity of rod 106 as would be understood by one of ordinary skill in the art.

To summarize, the following three events occur simultaneously during the welding operation: (i) rod 106 rotates, (ii) work piece 200 experiences relative movement 300 with compressive forces 112/114 applied to plates 102/104, and (iii) heat is supplied by induction heat source 120. As a result, the temperature of work piece 200 adjacent to rod 106 (i.e., the "weld nugget" of work piece 200 generated during the weld operation and illustrated by the portion of work piece 200 between dashed lines 200A) is a function of the following:
- the friction between the surface of rotating rod 106 and work piece 200 where such friction is affected by the rotational speed of rod 106;
- the friction between the surfaces of work piece 200 and surfaces 102A/104A where such friction is affected by the speed of relative movement 300; and
- the heat supplied by induction heat source 120.

In accordance with the present invention, a sensor that is remotely located with respect to weld nugget 200A is used to provide an indication of the temperature of weld nugget 200A. In the illustrated embodiment, an ultrasonic temperature sensor ("UTS") 130 and controller 132 are provided to control one or more of the above sources affecting the temperature of weld nugget 200A. As is known in the art, sensor 130 transmits ultrasonic energy and is sensitive to echoes generated thereby, i.e., the echoes transmitted back to sensor 130 along its axis of sensitivity 130A. Ultrasonic temperature sensor 130 is coupled to plate 104 (or plate 102) such that its axis of sensitivity 130A is parallel to the cylindrical surface of rod 106 (i.e., parallel to longitudinal axis 106A) and such that the sensor 130 receives echoes generated by surfaces 104A and 102A at weld nugget 200A. To more clearly illustrate these principles, additional reference will be made to FIG. 2 where the welding head assembly and work piece 200 are shown in isolation.

In FIG. 2, the transmission pulse(s) generated by sensor 130 are referenced by arrow 140. When transmission 140 encounters the interface between surface 104A and work piece 200 at weld nugget 200A, a first echo 142 is generated. Transmission 140 continues through work piece 200 and will encounter the interface between work piece 200 and surface 102A where a second echo 144 is generated. It is to be understood that the lateral "spacing" between transmission 140 and echoes 142/144 is done simply for purpose of illustration. Controller 132 is supplied with ultrasonic propagation characterization(s) (e.g., speed of ultrasound therein) of plate 104 (or plate 102) and work piece 200. Controller 132 then uses the propagation characterization(s) and the time of flight associated with echoes 142 and 144 to estimate the temperature of weld nugget 200A. Use of ultrasonic echoes to provide an indication of temperature is disclosed in U.S. Pat. No. 7,470,056, the contents of which are hereby incorporated by reference.

Controller 132 uses the estimated temperature of weld nugget 200A to control one or more of rotational drive sources 120, induction heat source 120, and movement mechanism 116. For example, a temperature reduction in weld nugget 200A can be achieved by one or more of a reduction in the rotation speed of rod 106, an increase in the speed of relative movement 300 as a means to more quickly dissipate the heat in weld nugget 200A, and a reduction in the heat supplied by induction heat source 120. Conversely, if the temperature in weld nugget 200A needs to be increased, one or more of the rotational speed of rod 106 could be increased, speed of relative movement 300 could be decreased, and heat supplied by source 120 could be increased.

The advantages of the present invention are numerous. A readily available ultrasonic temperature sensor can be coupled to an existing thermal stir welding system to generate signals (i.e., echoes) indicative of temperature of a weld nugget. The weld nugget temperature can then be used to control one or more sources that contribute to temperature of the weld nugget. In this way, the present invention can be used to maintain tight temperature tolerances thereby making thermal stir welding a viable option for materials that were previously considered to be incapable of being welded.

Although the invention has been described relative to a specific embodiment thereof, there are numerous variations and modifications that will be readily apparent to those skilled in the art in light of the above teachings. For example, the ultrasonic temperature sensor could be replaced with other temperature sensing devices/schemes that can provide an indication of weld nugget temperature without being in actual contact therewith. It is therefore to be understood that, within the scope of the appended claims, the invention may be practiced other than as specifically described.

What is claimed as new and desired to be secured by Letters Patent of the United States is:

1. A thermal stir welding system, comprising:
   a thermal stir welding head assembly to include
   a first plate defining a first surface,
   a second plate spaced apart from said first plate and defining a second surface that opposes said first surface wherein said first surface is maintained parallel to said second surface,
   a rod passing through said first plate and at least partially through said second plate, said rod passing perpendicularly through said first surface and said second surface wherein said rod is rotatable about a longitudinal axis thereof relative to said first surface and said second surface, and
   said welding head assembly adapted to have a work piece disposed between said first surface and said second surface wherein the work piece is in a plastic state thereof in a region adjacent to said rod as said rod rotates about said longitudinal axis thereof and as said welding head assembly and the work piece experience relative movement therebetween in a direction perpendicular to said longitudinal axis;
   a heat source adapted to inductively heat the work piece in at least said region;
   a controllable drive source coupled to said rod for rotating said rod about said longitudinal axis thereof;
   a mechanism adapted to be coupled to one of the work piece and said welding head assembly for causing said relative movement between said welding head assembly and the work piece;
   an ultrasonic temperature sensor coupled to one of said first plate and said second, said ultrasonic temperature sensor having an axis of sensitivity that is aligned parallel to a surface of said rod in said region where the work piece is in the plastic state, said ultrasonic temperature sensor transmitting ultrasonic energy along said axis of sensitivity wherein echoes are generated at each of said first surface and said second surface; and a controller coupled to said ultrasonic temperature sensor for generating at least one control signal using said echoes to estimate temperature of the work piece in said region, said controller coupled to at least one of said controllable drive source, said heat source, and said mechanism for causing said relative movement, wherein at least one of rotational speed of said rod, heat supplied by said heat source, and speed of said relative movement are controlled.

2. A thermal stir welding system as in claim 1, wherein said rod is substantially cylindrical.

3. A thermal stir welding system as in claim 1, wherein said rod is made from metal.

4. A thermal stir welding system, comprising:
a thermal stir welding head assembly to include
a first plate defining a first surface,
a second plate spaced apart from said first plate and defining a second surface that opposes said first surface wherein said first surface is maintained parallel to said second surface,
a rod passing through said first plate and at least partially through said second plate, said rod passing perpendicularly through said first surface and said second surface wherein said rod is rotatable about a longitudinal axis thereof relative to said first surface and said second surface, and
said welding head assembly adapted to have a work piece disposed between said first surface and said second surface wherein a first interface is defined between the work piece and said first surface and a second interface is defined between the work piece and said second surface, and wherein the work piece is in a plastic state thereof in a region adjacent to said rod as said rod rotates about said longitudinal axis thereof and as said welding head assembly and the work piece experience relative movement therebetween in a direction perpendicular to said longitudinal axis;

a heat source adapted to inductively heat the work piece in at least said region;

a controllable drive source coupled to said rod for rotating said rod about said longitudinal axis thereof;

a mechanism adapted to be coupled to one of the work piece and said welding head assembly for causing said relative movement between said welding head assembly and the work piece;

an ultrasonic temperature sensor coupled to one of said first plate and said second plate, said ultrasonic temperature sensor having an axis of sensitivity that is aligned parallel to a surface of said rod in said region where the work piece is in the plastic state, said ultrasonic temperature sensor transmitting ultrasonic energy along said axis of sensitivity, wherein echoes are generated at said region by said first interface and said second interface, said ultrasonic temperature sensor sensing said echoes; and a controller coupled to said ultrasonic temperature sensor for generating at least one control signal using said echoes so-sensed to estimate temperature of the work piece in said region, said controller coupled to at least one of said controllable drive source, said heat source, and said mechanism for causing said relative movement, wherein at least one of rotational speed of said rod, heat supplied by said heat source, and speed of said relative movement are controlled.

5. A thermal stir welding system as in claim 4, wherein said rod is substantially cylindrical.

6. A thermal stir welding system as in claim 4, wherein said rod is made from metal.

* * * * *